(12) United States Patent
Wouters

(10) Patent No.: US 8,834,042 B2
(45) Date of Patent: Sep. 16, 2014

(54) QUICK TERMINATED FIBER OPTIC TERMINI AND FIBER OPTIC CABLE, AND METHOD FOR MAKING

(75) Inventor: Vincent A. Wouters, McKinney, TX (US)

(73) Assignee: Applied Optical Systems, Inc., Plano, TX (US)

( * ) Notice: Subject to any disclaimer, the term of this patent is extended or adjusted under 35 U.S.C. 154(b) by 176 days.

(21) Appl. No.: 12/891,488

(22) Filed: Sep. 27, 2010

(65) Prior Publication Data

US 2011/0103753 A1    May 5, 2011

Related U.S. Application Data

(63) Continuation of application No. 11/998,848, filed on Nov. 30, 2007, now abandoned.

(60) Provisional application No. 60/872,109, filed on Dec. 1, 2006.

(51) Int. Cl.
    *G02B 6/36*    (2006.01)
    *G02B 6/255*   (2006.01)
    *G02B 6/38*    (2006.01)

(52) U.S. Cl.
    CPC ............ *G02B 6/3846* (2013.01); *G02B 6/2558* (2013.01); *G02B 6/3387* (2013.01); *G02B 6/2551* (2013.01)
    USPC .................................. 385/99; 385/78; 385/95

(58) Field of Classification Search
    CPC ... G02B 6/3887; G02B 6/3869; G02B 6/2558
    USPC .................. 385/53, 69, 70, 76–78, 81, 95–99; 65/392, 407
    See application file for complete search history.

(56) References Cited

U.S. PATENT DOCUMENTS

| | | | | |
|---|---|---|---|---|
| 4,971,418 A * | 11/1990 | Dorsey et al. | ................... | 385/96 |
| 5,592,579 A * | 1/1997 | Cowen et al. | ................... | 385/99 |
| 5,784,514 A | 7/1998 | Yanagi et al. | | |
| 8,094,988 B2 * | 1/2012 | Billman et al. | ............... | 385/134 |
| 2005/0094945 A1 * | 5/2005 | Danley et al. | ................... | 385/78 |
| 2006/0093300 A1 * | 5/2006 | Marrs et al. | ................... | 385/134 |
| 2006/0153502 A1 * | 7/2006 | Giotto et al. | ................... | 385/53 |

OTHER PUBLICATIONS

International Search Report issued in International Patent Application No. PCT/US2007/024702 on Jun. 6, 2008.
Written Opinion of the International Searching Authority issued in International Patent Application No. PCT/US2007/024702 on Jun. 6, 2008.

* cited by examiner

*Primary Examiner* — Uyen Chau N Le
*Assistant Examiner* — Michael Mooney
(74) *Attorney, Agent, or Firm* — Robert D. McCutcheon

(57) ABSTRACT

A quick terminating fiber optic assembly and method of making same is provided. A pre-terminated fiber optic assembly having an optical fiber already terminated therein includes an exposed optical fiber. The exposed fiber is aligned and contacted with a second exposed optical fiber of another optical cable, and the two fibers are spliced. A sleeve is provided to cover and protect the splice and any exposed fibers. The sleeve secures the pre-terminated fiber optic termini to second optical fiber. This process terminates the second optical fiber at the termini in less time and with the same or similar tools as a conventional method of terminating optical fibers at a termini.

7 Claims, 9 Drawing Sheets

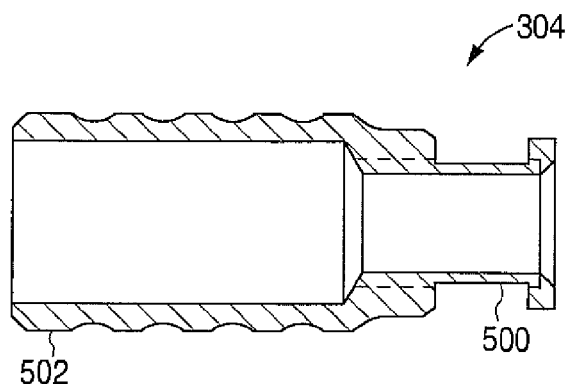
FIG. 5
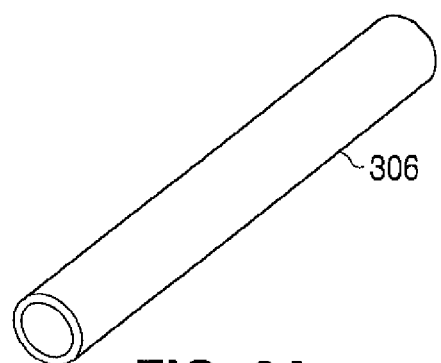 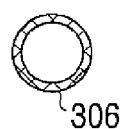
FIG. 6A FIG. 6B
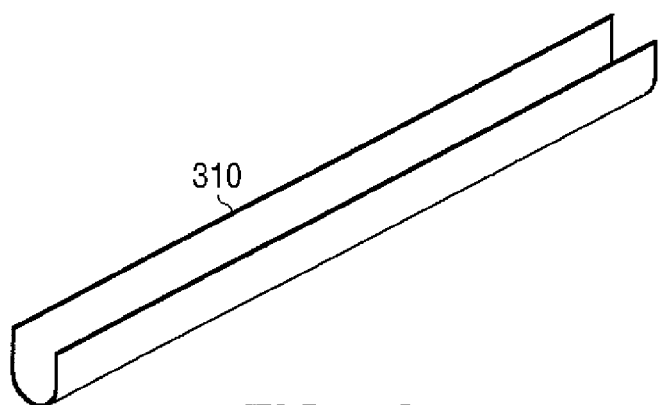 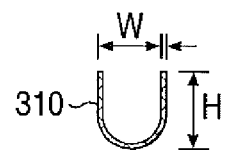
FIG. 7A FIG. 7B

QUICK TERMINATED FIBER OPTIC TERMINI AND FIBER OPTIC CABLE, AND METHOD FOR MAKING

CROSS REFERENCE TO RELATED APPLICATION

This application is a continuation of prior application Ser. No. 11/998,848 filed on Nov. 30, 2007, which claims priority under 35 USC 119(e) to U.S. provisional Application Ser. No. 60/872,109, filed on Nov. 30, 2007, and which is incorporated herein by reference.

TECHNICAL FIELD

The present invention relates generally to fiber optic termini assembly and termination methods, and more particularly to a fiber optic termini assembly having a fiber optic termini and splice assembly for splicing together two optical fibers, and method of making same.

BACKGROUND

FIGS. 1 and 2 are perspective views illustrating a prior art fiber optic pin termini 100 and a prior art fiber optic socket termini 200, respectively. These termini are constructed, in accordance with, and meet several applicable military specifications including MIL-PRF-29504/14 and MIL-PRF-29504/15, respectively, and MIL-PRF-28876 (insert cavities), which are all incorporated herein by reference. When terminating a fiber optic, the termini and resulting termini assembly should also meet performance specifications MIL-PRF-29504B, which is incorporated herein by reference. Other specification may be applicable.

In the past, fiber optic termination (new termination or replacement of a termini) using the termini 100, 200 has been performed according to conventional method(s) that includes cutting and polishing of the fiber, insertion of fiber in the termini 100, 200, and affixing or securing the fiber to the termini body using epoxy. This process is time-consuming and usually can only be performed at specific locations having ideal or adequate working conditions. Some locations, such as in the field, etc, are not conducive to performance of this process.

The fiber optic cables used and attached to the termini 100, 200 generally include an inner optical fiber (for carrying an optical signal) surrounded by the clad or buffer layer, an outer protection layer around the buffer layer which usually includes fiber elements made of a high performance fiber (such as an aramid fiber, such as KEVLAR™, or a high strength polyethylene fiber), and an outer jacket protecting these inner layers.

Accordingly, there exists a need for a fiber optic termini assembly that is constructed according to a quick connect termination process that is less time-consuming and meets one or current specifications which allows for intermatability and use with many fiber optic connectors.

SUMMARY

In accordance with one embodiment of the present disclosure, there is provided a fiber optic termini assembly including a pre-terminated fiber optic termini, the pre-terminated fiber optic termini having a termini body having a front portion and a rear portion and a first fiber optic cable terminated within the termini body and having an first optical fiber extending from a rear portion. The assembly further includes a second fiber optic cable have a second optical fiber, wherein the first optical fiber is sliced to the second optical fiber at a splice junction, and one or more sleeves positioned substantially around the splice junction and coupling the pre-terminated fiber optic termini to a body of the second optical cable.

In another embodiment, there is provided a method of terminating a first fiber optic cable having a first optical fiber at a fiber optic termini. The method includes providing a pre-terminated fiber optic termini having a termini body having a front portion and a rear portion and a first fiber optic cable terminated within the termini body and having an first optical fiber extending from a rear portion. A second fiber optic cable is stripped to expose a second optical fiber and an end of the first optical fiber is spliced to an end of the second optical fiber to create a splice junction. The splice junction is protected using a protection device that substantially encompasses the splice junction and portions of the first and second optical fibers therein.

In yet another embodiment, there is provided a fiber optic termini termination kit including a pre-terminated fiber optic termini having a termini body having a front portion and a rear portion and a first fiber optic cable terminated within the termini body and having an first optical fiber extending from a rear portion. The kit further includes a splice sleeve configured to be positioned substantially around a splice junction operably coupling portions of the first optical fiber and a second optical fiber of a second fiber optic cable, and a splice cover sleeve configured to be positioned substantially around the splice sleeve and be extended over a rear portion of the pre-terminated fiber optic termini and be extended over a crimp member when affixed to the second optical fiber.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 5 is a cross-sectional view of one embodiment of a crimp tail in accordance with the present disclosure;

FIGS. 6A and 6B are perspective and end views, respectively, of one embodiment of a crimp tube in accordance with the present disclosure; and FIGS. 7A and 7B are perspective and end views, respectively, of one embodiment of a fiber optic splice crimp and protection device in accordance with the present disclosure;

DETAILED DESCRIPTION

Figure 1:
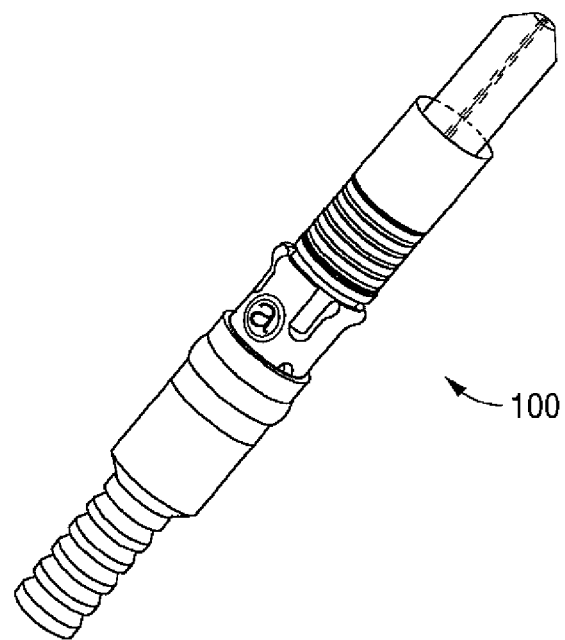
FIGS. 1 and 2 illustrate prior art fiber optic termini (pin and socket)
Figure 2:
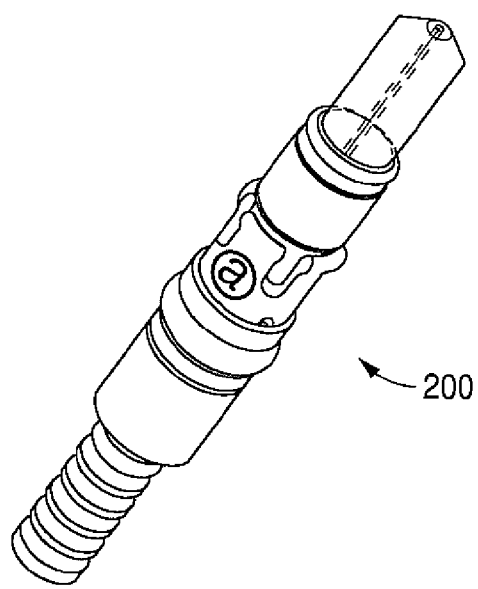

As described above, FIGS. 1 and 2 illustrate prior art fiber optic termini 100, 200. As shown, these termini 100, 200 are depicted as meeting MIL-PRF-29504/14 and /15. Though describe as meeting these specifications, other prior art termini having different structures, shapes and functionality may be utilized in the fiber optic termini assembly according to the present disclosure, as more fully described below It will be understood that the term "termini" as used herein refers to a terminus or single termination device.

Figure 3:
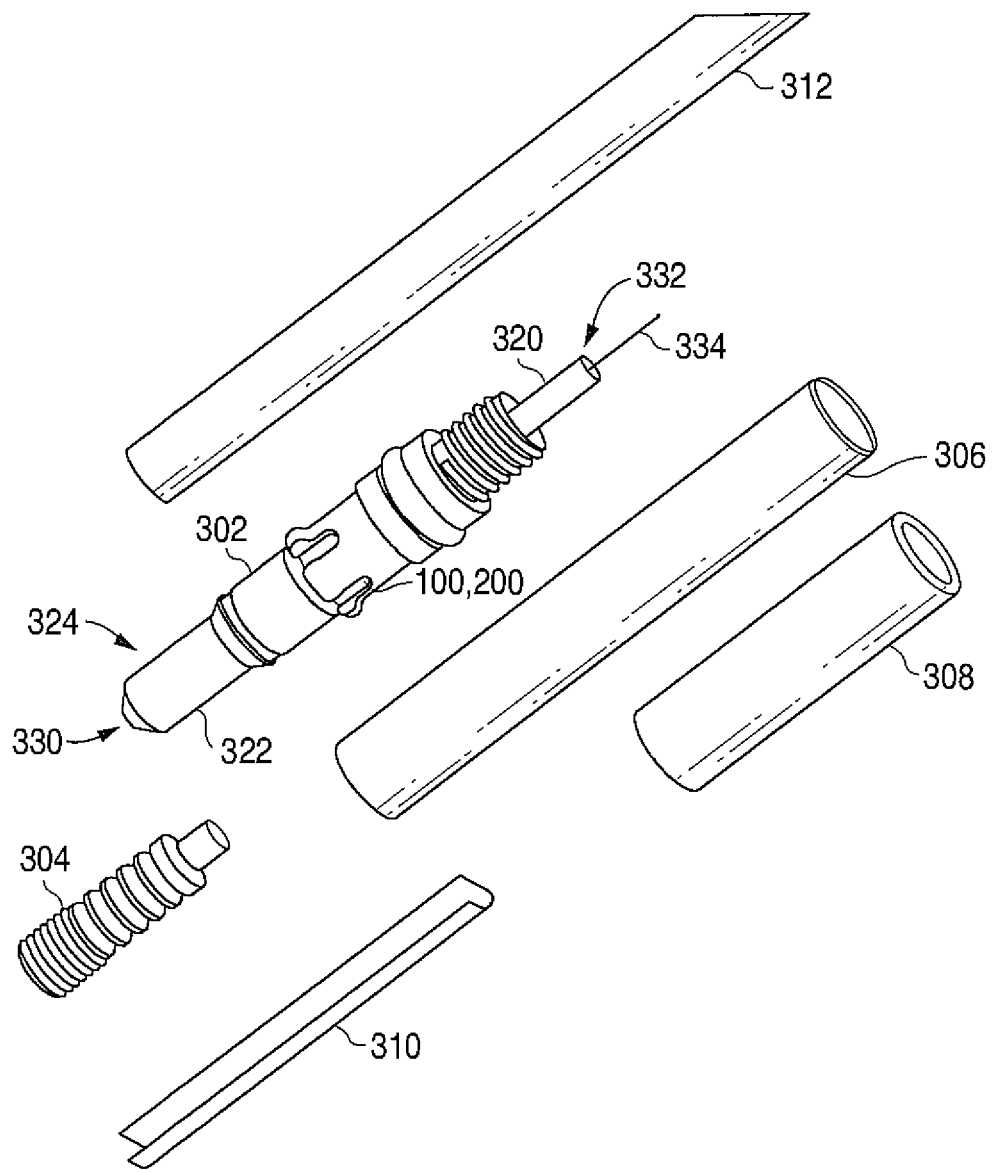
FIG. 3 depicts a kit having several components for constructing a fiber optic termini termination assembly in accordance with one embodiment of the present disclosure.

Now turning to FIG. 3, there is illustrates various components of a fiber optic termini assembly 300 in accordance with the present disclosure. These components include a pre-terminated termini (pin or socket) 302, a crimp tail 304, a splice cover tube or sleeve 306, a first crimp sleeve 308, a protective crimp device 310, and a fiber optic cable (jacketed fiber) 312.

It will be understood that two or more of the components illustrated in FIG. 3 may be included within a component kit (e.g., a termini termination kit) that is provided to a consumer or other party to enable manufacture or construction of the fiber optic termini assembly 300. In one embodiment, the kit includes the pre-terminated termini (pin or socket) 302, the crimp tail 304, the splice cover tube or sleeve 306, the first crimp sleeve 308 and the protective crimp device 310. Other configurations of the kit are contemplated (e.g., any two, three, four or five of the components), and multiples of components may be included therein, also. Though not shown, the kit may include one or more tools or other devices for use a method of making the fiber optic termini assembly 300—as described in more detail below.

The pre-terminated termini 302 may be configured as a pin or socket termini. The termini 302 is pre-terminated—it includes the termini 100, 200 and a fiber optic (optical) cable 320 disposed therein or coupled thereto. In other words, the optical cable 320 is installed or terminated in the termini 100, 200 such that the termini 100, 200 and terminated fiber 320 form the pre-terminated termini 302. When terminated, a polished fiber end 330 of the cable 320 extends through a ferrule 322 at a front portion 324 of the termini 302 while another end 332 of the cable 320 extends outward from the rear portion 332 of the termini 304. In the embodiment shown, the end 332 of the cable 320 includes a stripped fiber end 334. The end 332 may be unprepared (e.g., not stripped).

Now referring to FIG. 5, there is illustrated a cross-sectional view of one embodiment of the crimp (or splice) tail 304 in accordance with the present disclosure. The crimp tail 304 functions to extend one end of the splice cover sleeve 306. The crimp tail 304 includes a first end 500 and a second 502. The first end 500 terminates or mates with an end of the fiber cable 312, while the second end 502 will receive the splice cover sleeve 306. The crimp tail 304 may be constructed of any suitable material(s).

FIGS. 6A and 6B are perspective and end views, respectively, of one embodiment of the splice cover tube or sleeve 306 in accordance with the present disclosure. One end of the sleeve 306 is affixed/coupled to the body (rear portion) of the pre-terminated termini 302 and the other end will be affixed/coupled to the crimp tail 304. The sleeve 306 acts as an outer protective layer or material for a fiber optic splice between two exposed fibers (described below). The sleeve 306 may be constructed of any suitable material(s).

FIGS. 7A and 7B are perspective and end views, respectively, of one embodiment of the fiber optic splice crimp or protection device 310 in accordance with the present disclosure. In one embodiment, the protective crimp 310 has a U-shape or U-shaped cross-section, however other shapes and cross-sections may be utilized. The splice crimp 310 functions to crimp to the exposed jacket of both sides of the fused fibers (fiber splice) of the fiber cable 312 and fiber cable 320. This provides an inner protective layer or material around the fused fiber junction, and additionally, establishes a secure bond to both cable jackets increasing axial strength between the fused fiber ends. In the embodiment shown, the height H is greater than the width W, and in a specific embodiment, H is about the same as W. The splice crimp 310 may be constructed of any suitable material(s).

No drawings of the crimp sleeve 308 are provided, as standard OFCC crimp sleeves or similar devices may be used.

It will be understood that the size and configuration (and materials) of the crimp tail 304, the splice cover sleeve 306 and the splice protective device 310, in one embodiment, are chosen to allow or enable the resulting fiber optic termini assembly 300 meet certain desired specifications (e.g., compatible with MIL SPEC 29504/14 or /15 and MIL SPEC 28876, or otherwise interchangeable with prior art socket/pin termini). The termini assembly 300 (and its method of manufacture) results in a product similar to the current MIL-PRF-29504/14 and /15 termini, with an extension in the rear of the termini. This design enables all existing insert, extraction, captivator guide bushing tools and crimp sleeve tools to be utilized without need for the operator to change procedures. Field polishing is not required to due the pre-polished status of the termini ceramic ferrule in the pre-terminated termini 302.

Now turning to FIGS. 4A through 4L, these figures illustrate multiple process steps for manufacturing (making, constructing) the fiber optic termini termination assembly 300. Various states of manufacture are shown. Thought the following description describes a step-by-step process, not all steps are necessarily shown, and not all shown steps are necessary, and are not necessarily required to be performed in the same order shown.

Figure 4A:
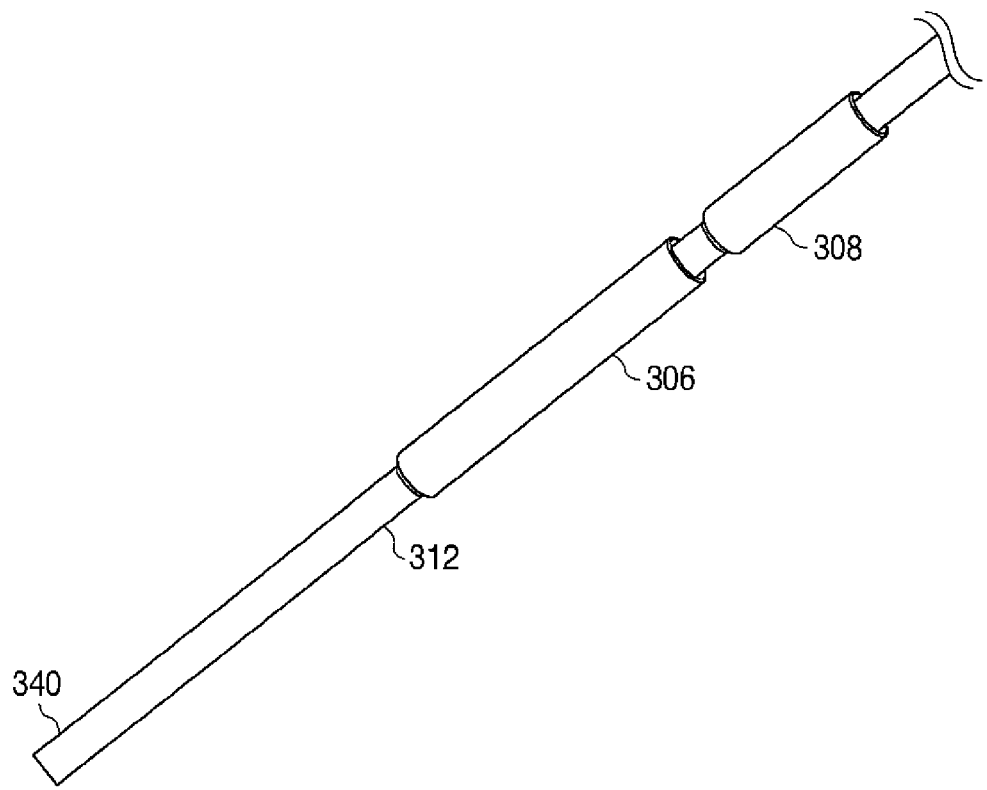
FIGS. 4A-4L illustrate multiple process steps for constructing the fiber optic termini termination assembly.
Figure 4B:
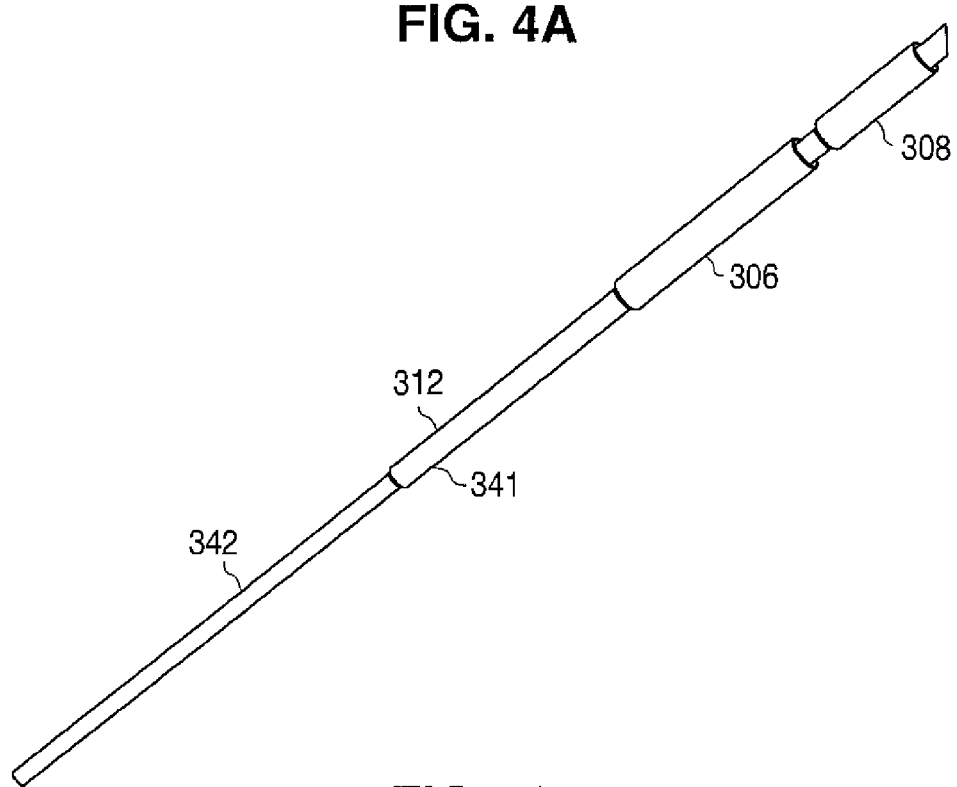

With reference to FIG. 4A, the fiber cable 312 is provided and the crimp sleeve 308 and splice cover sleeve 308 are slid and placed over/around the fiber cable 312, as shown. As will be appreciated, the end 340 is intended to be the fiber end that is spliced with the fiber cable 320.

Figure 4C:
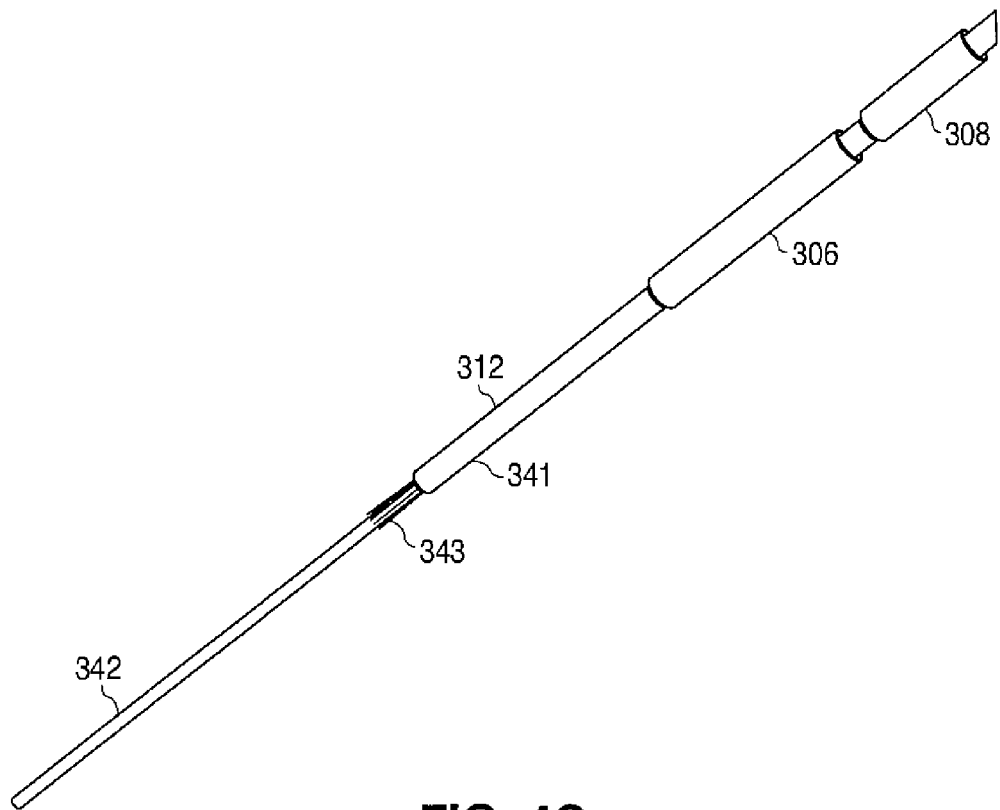

The fiber optic cables 312, 320 typically include an inner optical fiber (surrounded by a buffer layer or member. An outer sheath or cladding layer or member surrounds the buffer layer, while an outer jacket layer or member protects the outer sheath or cladding member. The composition and structure of the fiber optic cables 312, 320 are known to those skilled in art, and may include additional members or layers of material With reference to FIG. 4B, a portion of the OFFC jacket 341 on the fiber cable 312 is stripped/removed to expose a buffer material layer 342 (or other intermediate layer). In one example, about 1.5 inches of the jacket 341 may be removed. With reference to FIG. 4C, an outer portion 343 of the buffer material layer 342 is trimmed leaving a portion extending from the untrimmed cable toward the end 340. This outer portion may be a cladding layer, such as Kevlar. In one example, after removal, the remaining portion of the exposed layer 343 is about 0.15 inches.

Figure 4D:
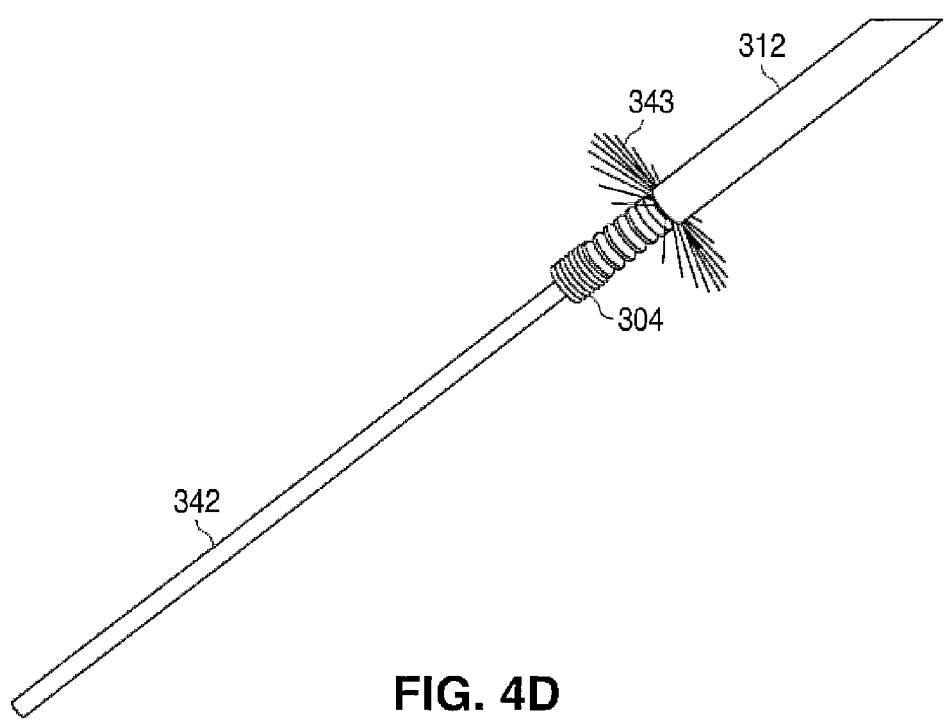

With reference to FIG. 4D, the crimp tail 304 is positioned by sliding it onto the remaining buffer layer 342 of the fiber cable 312 until it abuts the edge of the trimmed jacket 341, as shown. This causes the trimmed layer 343 to be displaced and expand outward from the fiber cable 312, as shown.

Figure 4E:
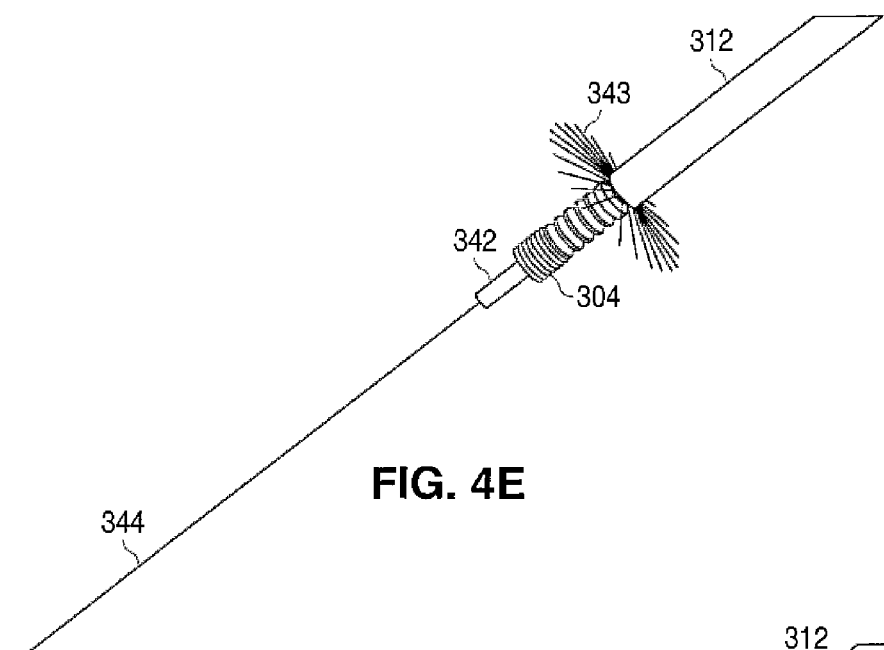

With reference to FIG. 4E, a portion of the remaining buffer layer 342 is removed exposing optical fiber 344. This may be accomplished using a precision stripper (such as a Schieunger Fiber Optic 7010 automatic stripper) or regular hand tools (such as a Miller stripper). After cleaning the fiber 344, the fiber 344 is cut to the desired length (using a precision cleaver or similar tool) and its end is ready for splicing to the exposed end of the fiber cable 334 of the pre-terminated termini 302.

Figure 4F:
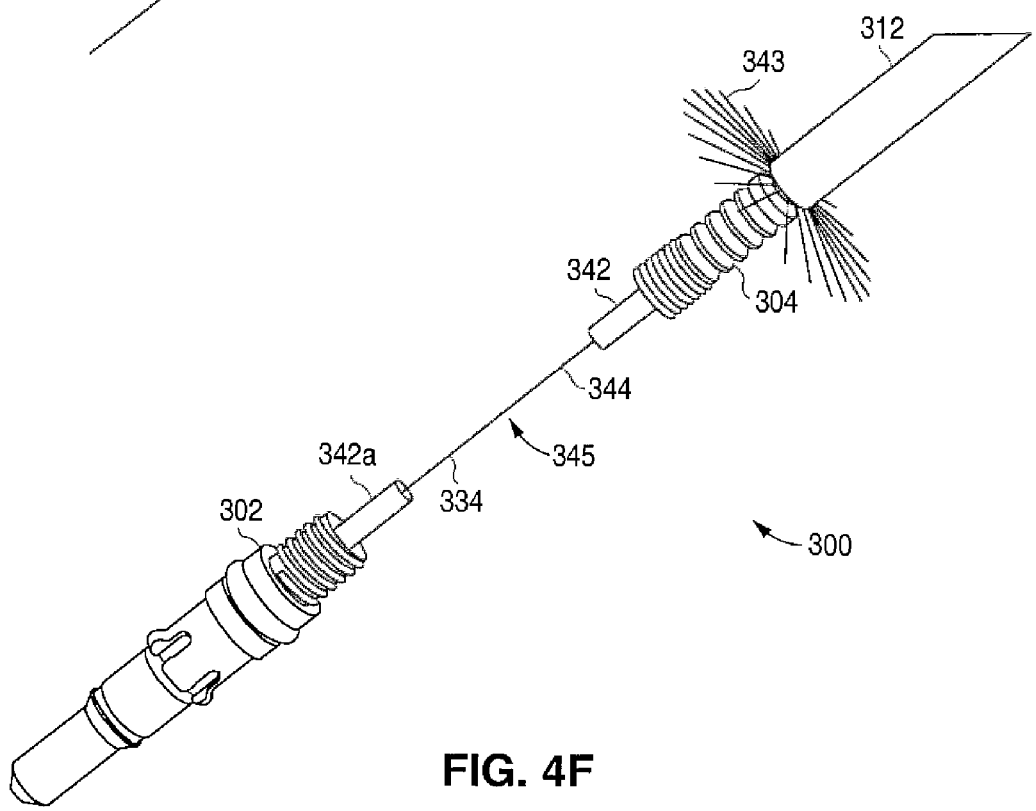

With reference to FIG. 4F, the pre-terminated termini 302 and the prepared optical cable 312 are inserted into a splicing system (not shown), which may include a holding fixture, that aligns the respective ends of the optical fibers 334, 344. In one embodiment, the holding fixture is part of splice device (not shown) that fuses or splices two optical fibers together. One example splice device that may be utilized for splicing is a fusion splice machine available from Diamond USA under the tradename "Zeus." The holding fixture may be configured as a cradle and rigidly secures the termini 302 and optical cable 312, thus preventing movement. This may be done by captivating the both the body of the termini 302 and the crimp tail 304 (attached to the optical cable 312).

After the components are secured and the fiber ends aligned, the fibers are spliced or fused together. The splicing device may include pre-sets for both multi- and single mode fibers, and multiple fusion conditions (temperature and duration of arc) for various types of fiber optic cables. Prior to splice/fusion, the operator adjusts positioning of the optical cable 312 to align and contact the fiber end 344 with the fiber end 334 terminated to the pre-terminated termini 302. A screen visually indicates when the two fiber ends are in proper alignment and contact. Then, the fiber ends are fuses/spliced. Visual and audible indications may be provided to the operator showing the actual splice. Upon successful visual analysis of the splice 345, the splice system remains in place for the next step.

Figure 4G:
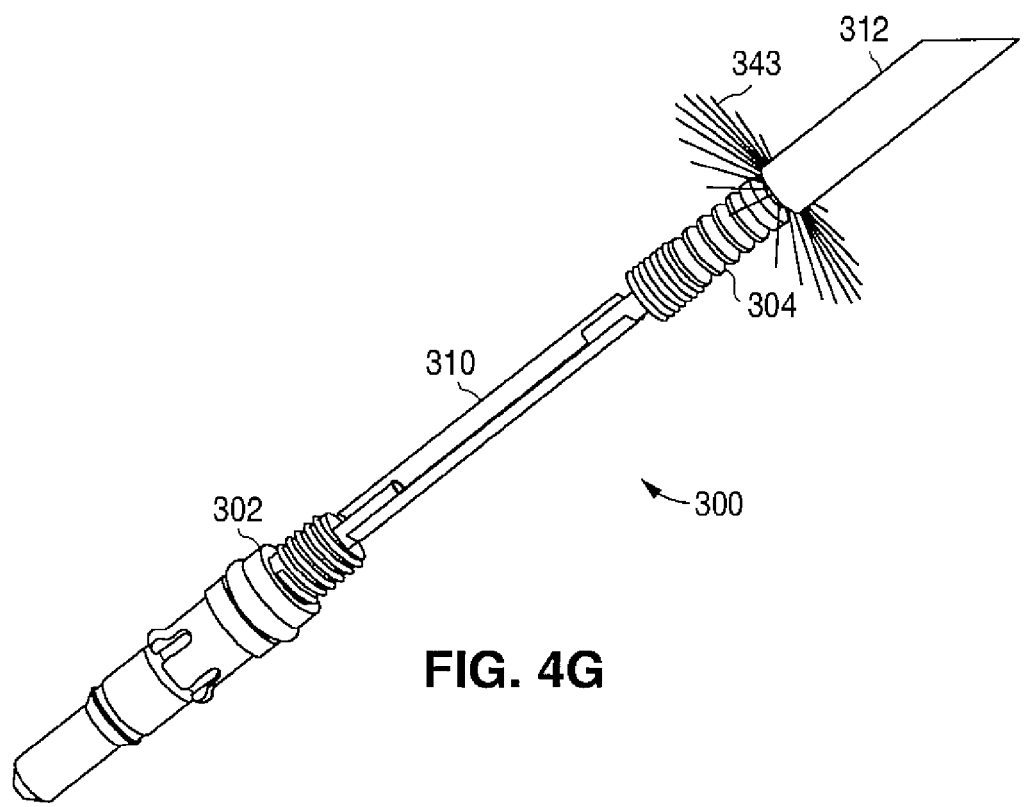
Figure 4H:
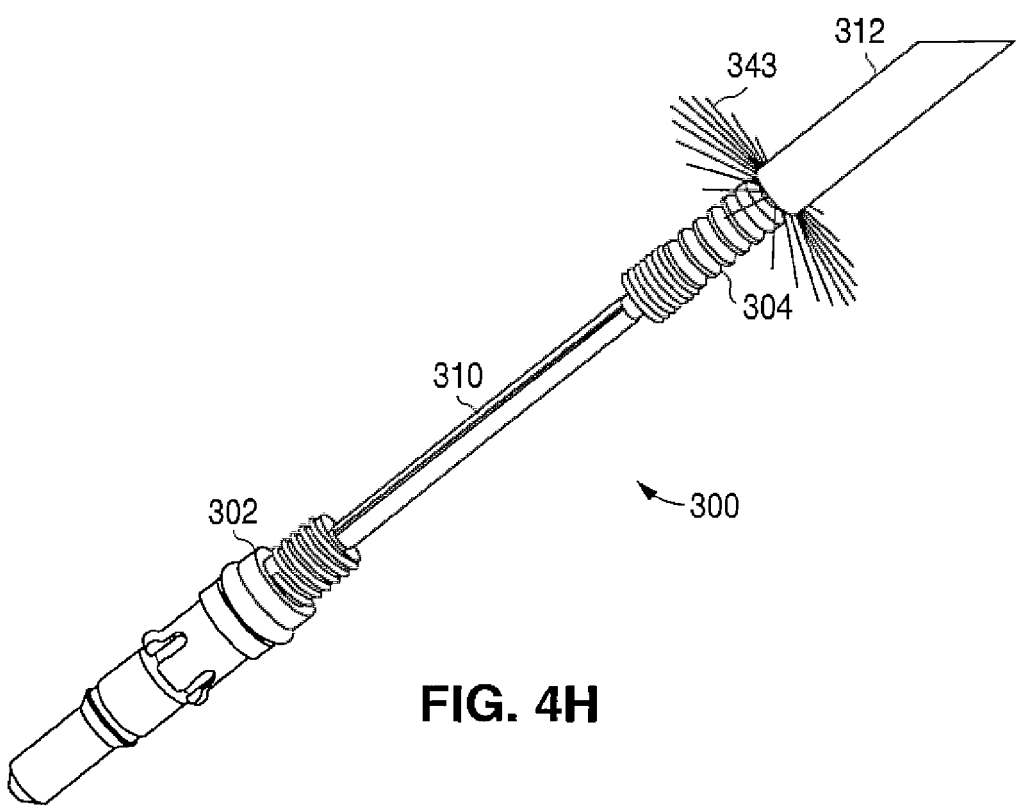

With reference to FIGS. 4G and 4H, after splicing and while both the termini 302 and cable 312 are secured in the splice system, the splice crimp 310 is positioned over the splice area (or joint), including over a portion of the buffer layer 342 and a portion of the buffer layer 342a, as shown in FIG. 4G. During this process, a stabilizing hatch system (with a window and door) swings over the splice crimp 310 and a crimp tool is inserted into a window at the top of the door. The hatch system stabilizes the crimp tool once after insertion over the splice crimp 310 to ensure the crimp tool does not accidentally contact or damage the splice. Other methods may be used to secure the splice crimp 310 around the splice 345 and the exposed fibers 334, 344.

Figure 4I:
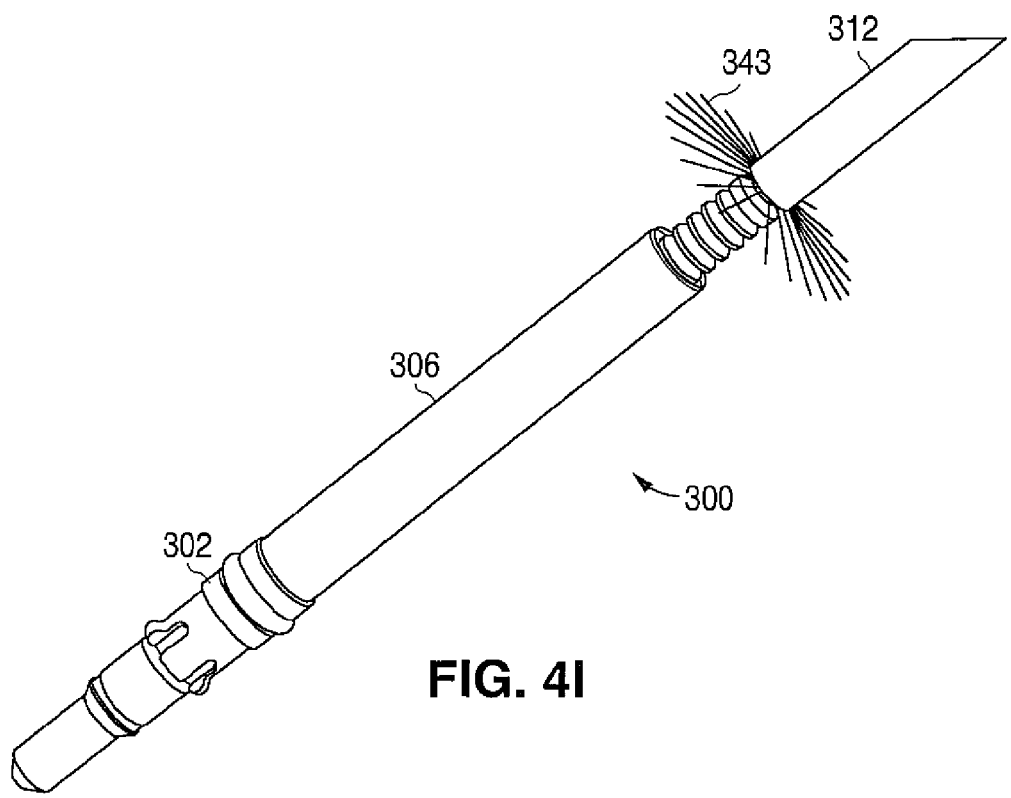
Figure 4J:
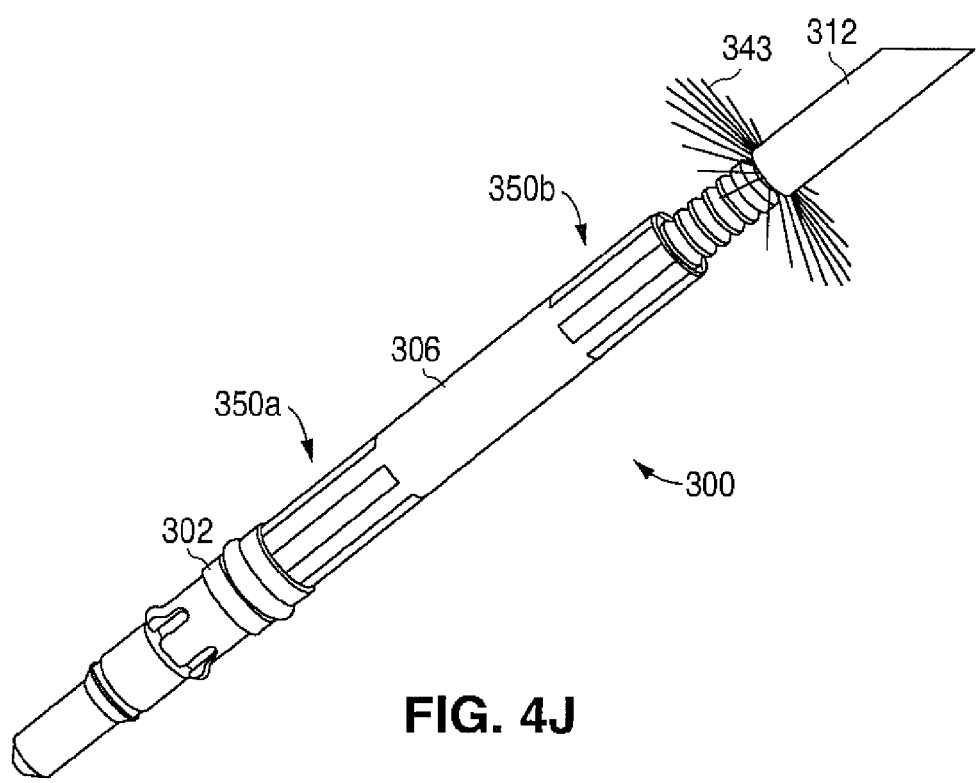

With reference to FIGS. 4I and 4J, after the splice sleeve 310 is secured, the crimp sleeve 308 is positioned over the splice sleeve 310, a portion (rear portion) of the pre-terminated termini 302 and the second end 502 of the crimp tail 304, as shown in FIG. 4I. One end of the splice cover sleeve 306 is crimped to secure it to the pre-terminated termini 302 (see crimped portion 350a). The other end of the splice cover sleeve 306 is crimped to secure it to the crimp tail 304 (see crimped portion 350b). In one embodiment, a standard hex crimp tool is used. Other methods of attachment or fastening might be used.

Figure 4K:
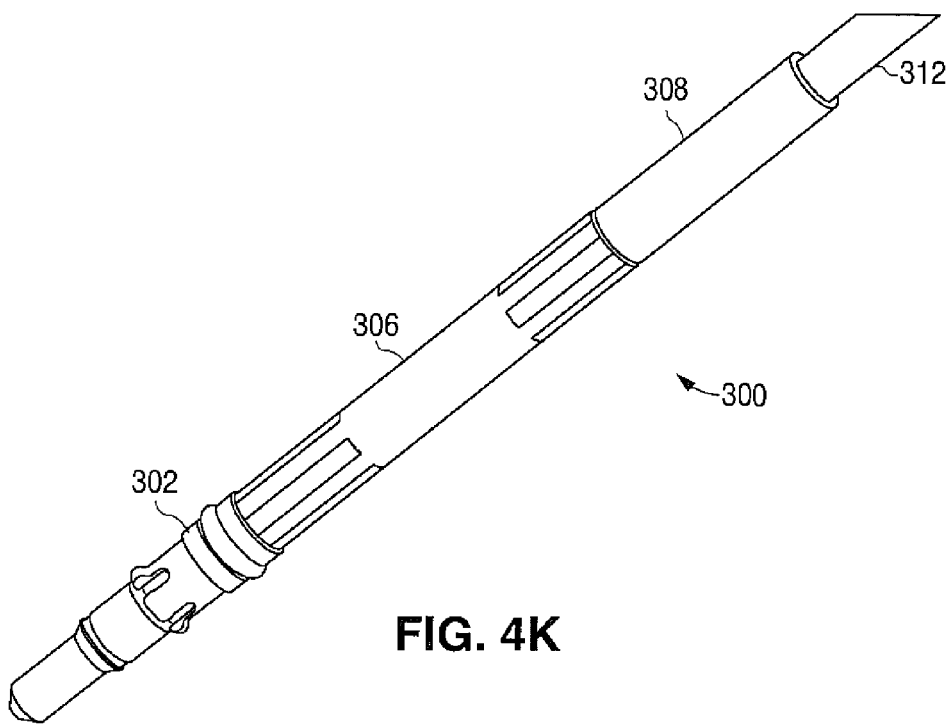
Figure 4L:
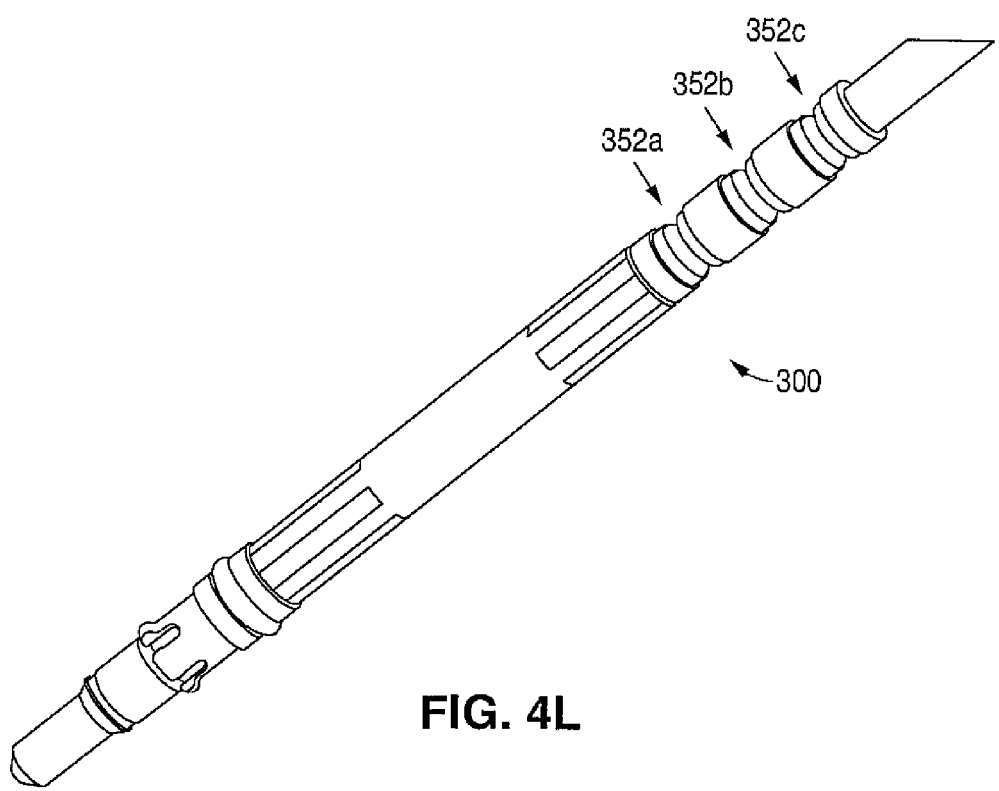

With reference to FIGS. 4K and 4L, after the splice cover sleeve 306 is secured, the first crimp sleeve 308 is positioned over portion of the trimmed layer 343, a portion of the jacket 341 on the fiber cable 312 (rear portion) and a portion of the crimp tail 304, as shown in FIG. 4K. The crimp sleeve is 308 is crimped at one or more locations (see crimped portions 352a, 352b, 352c) to secure the crimp sleeve 308, as shown in FIG. 4L. In one embodiment, a standard crimp tool is used. Other methods of attachment or fastening might be used.

Though the embodiments are described herein with respect to a fiber optic termini device and related suitable applications, another embodiment contemplates that the concepts and teachings of the present invention may be utilized in other terminals or termini, and thus not limited to fiber optic termini.

In other embodiments (not shown), the fiber optic termini assembly 300 is incorporated in a single or multi-channel fiber optic connector. Such connectors are well-known in the art.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fiber optic termini assembly comprising:
   a pre-terminated fiber optic termini comprising,
      a termini body having a front portion and a rear portion, the front portion comprising a ferrule, and
      a first fiber optic cable terminated within the termini body and having a first end of a first optical fiber extending from the rear portion and having a second end of the first optical fiber extending through the ferrule;
   a second fiber optic cable having a second optical fiber, wherein the first end of the first optical fiber is spliced to an end of the second optical fiber at a splice junction;
   at least two sleeves positioned substantially around the splice junction and coupling the pre-terminated fiber optic termini to a body of the second optical cable; and
   wherein the at least two sleeves comprise:
      a splice sleeve positioned substantially around the splice junction and exposed portions of the first and second optical fibers, the splice sleeve having a U-shaped cross-section prior to crimping, and
      a splice cover sleeve substantially encompassing the splice sleeve and extending over a rear portion of the pre-determined fiber optical termini and extending over a portion of a crimp tail affixed to the second optical fiber.

2. The fiber optic termini assembly in accordance with claim 1 wherein the
   splice sleeve has a height and a width, where the height is greater than the width.

3. The fiber optic termini assembly in accordance with claim 1 wherein the termini body of the pre-terminated fiber optic to mini is configured to meet a MIL-PRF-29504/14 specification.

4. A method of terminating a first fiber optic cable having a first optical fiber at a fiber optic termini, the method comprising:
   providing a pre-terminated fiber optic termini comprising,
      a termini body having a front portion with a ferrule and a rear portion, and
      a first fiber optic cable having a first end of a first optical fiber terminated within the termini body and extending through the ferrule and having a second end of the first optical fiber extending from the rear portion;
   stripping a second fiber optic cable to expose a second optical fiber; and
   splicing the second end of the first optical fiber to an end of the second optical fiber to create a splice junction; and protecting the splice junction by substantially encompassing the splice junction and portions of the first and second optical fibers and at least a portion of the termini body inside a protective device, wherein the protective device comprises:
   a splice sleeve positioned substantially around the splice junction and exposed portions of the first and second optical fibers, the splice sleeve having a U-shaped cross-section prior to crimping, and
   a splice cover sleeve substantially encompassing the splice sleeve and extending over a rear portion of the pre-determined fiber optical termini and extending over a portion of a crimp tail affixed to the second optical fiber.

5. A method in accordance with claim 4 wherein a laser splices the two fiber ends.

6. A fiber optic termini termination kit comprising:
a pre-terminated fiber optic termini comprising,
   a termini body having a front portion and a rear portion, the front portion comprising a ferrule, and
   a first fiber optic cable terminated within the termini body and having a first end of a first optical fiber extending from the rear portion and having a second end of the first optical fiber extending through the ferrule;
a splice sleeve configured to be positioned substantially around a splice junction operably coupling portions of the first optical fiber and a second optical fiber of a second fiber optic cable, the splice sleeve having a U-shaped cross-section;
a splice cover sleeve configured to be positioned substantially around the splice sleeve and be extended over the rear portion of the pre-terminated fiber optic termini and be extended over a crimp member when affixed to the second optical fiber.

7. The fiber optic termini assembly in accordance with claim 1 wherein the termini body of the pre-terminated fiber optic termini is configured to meet a MEL-PRF-29504/15 specification.

* * * * *